United States Patent
Laine

(10) Patent No.: US 9,081,077 B2
(45) Date of Patent: Jul. 14, 2015

(54) SYSTEM FOR TRACKING SHIPS AT SEA

(75) Inventor: Robert Laine, St. Xandre (FR)

(73) Assignee: Astrium SAS, Paris (FR)

( * ) Notice: Subject to any disclaimer, the term of this patent is extended or adjusted under 35 U.S.C. 154(b) by 462 days.

(21) Appl. No.: 13/517,463

(22) PCT Filed: Dec. 13, 2010

(86) PCT No.: PCT/FR2010/052682
§ 371 (c)(1),
(2), (4) Date: Sep. 5, 2012

(87) PCT Pub. No.: WO2011/083230
PCT Pub. Date: Jul. 14, 2011

(65) Prior Publication Data
US 2013/0002476 A1    Jan. 3, 2013

(30) Foreign Application Priority Data
Dec. 21, 2009 (FR) .................................. 09 06205

(51) Int. Cl.
| G05G 3/00 | (2006.01) |
| G08B 23/00 | (2006.01) |
| H04B 7/185 | (2006.01) |
| G01S 13/00 | (2006.01) |
| G05D 1/02 | (2006.01) |
| G01C 21/10 | (2006.01) |

(Continued)

(52) U.S. Cl.
CPC ............ G01S 5/0027 (2013.01); G01C 21/005 (2013.01); G01S 19/13 (2013.01); B64B 1/44 (2013.01)

(58) Field of Classification Search
USPC .............. 340/985, 573.6, 539.22, 686.6, 984; 342/353, 357.59, 36, 357.52; 701/300, 701/493, 500, 408
See application file for complete search history.

(56) References Cited

U.S. PATENT DOCUMENTS 3,384,891 A * 5/1968 Anderson ................ 342/357.64
4,232,313 A * 11/1980 Fleishman ..................... 342/36
(Continued)

FOREIGN PATENT DOCUMENTS

EP    0748084    12/1996
EP    0921411    6/1999
(Continued)

OTHER PUBLICATIONS

European Patent Office International Search Report dated Mar. 22, 2011, for International Application No. PCT/FR2010/052682 (3 pages).

Primary Examiner — Fekadeselassie Girma
(74) Attorney, Agent, or Firm — McCracken & Gillen LLC

(57) ABSTRACT

The system comprises terminals that are mounted onto a predetermined number of feeder vessels, comprises means for detecting identification signals sent by surrounding ships, and moreover comprises means for recording identification information that include the detected identification signals and the current position of the feeder vessel. Said system also comprises a system for transmitting data via satellites, said data transmitting system making it possible to transmit data between the terminals and a monitoring center, said monitoring center including a means for generating requests intended for the terminals in order to ask said terminals to provide the recorded identification information. Said monitoring center also includes a means for analyzing the received identification information.

7 Claims, 1 Drawing Sheet

(51) Int. Cl.
  *G01S 5/00* (2006.01)
  *G01S 19/13* (2010.01)
  *G01C 21/00* (2006.01)
  *B64B 1/44* (2006.01)

(56) References Cited

U.S. PATENT DOCUMENTS

| | | | | |
|---|---|---|---|---|
| 4,932,910 | A * | 6/1990 | Hayday | 441/11 |
| 5,065,161 | A * | 11/1991 | Shibutani | 342/176 |
| 5,633,644 | A * | 5/1997 | Schussler et al. | 342/455 |
| 6,009,373 | A * | 12/1999 | Shimojima et al. | 701/519 |
| 6,430,416 | B1 * | 8/2002 | Loomis | 455/456.1 |
| 6,952,180 | B2 * | 10/2005 | Jonsson et al. | 342/357.51 |
| 7,053,822 | B2 * | 5/2006 | Rickerson, Jr. | 342/357.54 |
| 7,623,871 | B2 * | 11/2009 | Sheynblat | 455/456.1 |
| 7,737,861 | B2 * | 6/2010 | Lea et al. | 340/8.1 |
| 7,848,905 | B2 * | 12/2010 | Troxler et al. | 702/187 |
| 7,855,654 | B2 * | 12/2010 | Katz | 340/573.6 |
| 7,925,210 | B2 * | 4/2011 | Brown et al. | 455/13.2 |
| 8,011,615 | B2 * | 9/2011 | Silansky et al. | 244/30 |
| 8,255,160 | B2 * | 8/2012 | Duffett-Smith et al. | 701/470 |
| 8,514,069 | B2 * | 8/2013 | Hadsall, Sr. | 340/539.13 |
| 8,626,430 | B2 * | 1/2014 | Dicke et al. | 701/467 |
| 8,825,232 | B2 * | 9/2014 | Knoblach et al. | 701/4 |
| 2003/0052776 | A1 * | 3/2003 | Richards | 340/539 |
| 2003/0135327 | A1 * | 7/2003 | Levine et al. | 701/220 |
| 2004/0030496 | A1 * | 2/2004 | Brodie | 701/213 |
| 2005/0261833 | A1 * | 11/2005 | Brosius et al. | 701/213 |
| 2008/0004798 | A1 * | 1/2008 | Troxler et al. | 701/207 |
| 2008/0086267 | A1 * | 4/2008 | Stolte et al. | 701/300 |
| 2008/0121690 | A1 * | 5/2008 | Carani et al. | 235/376 |
| 2008/0174484 | A1 * | 7/2008 | Katz | 342/357.07 |
| 2012/0239285 | A1 * | 9/2012 | Oster | 701/300 |
| 2013/0002476 | A1 * | 1/2013 | Laine | 342/353 |
| 2013/0214942 | A1 * | 8/2013 | Joss | 340/984 |
| 2013/0300560 | A1 * | 11/2013 | Hadsall, Sr. | 340/539.13 |

FOREIGN PATENT DOCUMENTS

WO 2007110512 10/2007
WO WO 2007110512 A1 * 10/2007

* cited by examiner

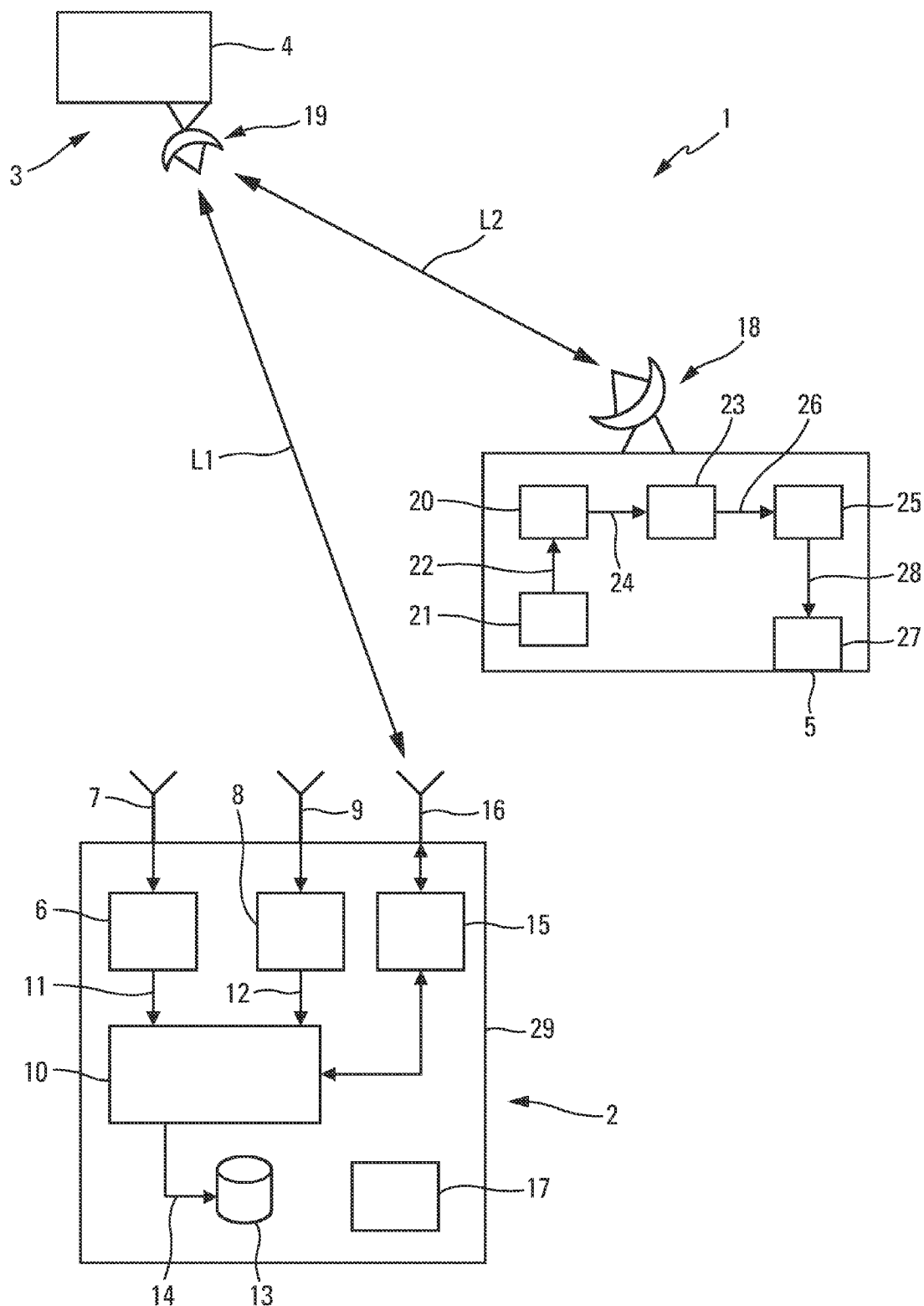

SYSTEM FOR TRACKING SHIPS AT SEA

The present invention relates to a tracking system for ships at sea, in particular on the high seas.

Such a tracking could be interesting not only for crew of ships for safety reasons, but also for shipowners who would like to know the position of their ships or even for the sea authorities who are supposed to enforce safety in a given economical area.

Different techniques are known to track ships on the high seas, namely:
 a) a visual observation from obliged passage points;
 b) a radar observation from coastal stations and a radio query of the ships;
 c) a listening, from coastal stations, of identification signals relative to an automatic identification system of the AIS ("Automatic Identification System") type; and
 d) a listening of such identification signals of the AIS type from satellites in low orbit.

The automatic identification system AIS is an automated message exchanging system between ships by radiocommunications at very high frequencies VHF, allowing the ships and the monitoring systems for the maritime traffic to know particularly the identity, the statute, the position and the route of the ships located in a given navigation area. Such system AIS allows in particular the ships to be identified when a visual or radar recognition is no longer possible (night, mist, weak radar echo).

However, such different techniques for ship tracking present some disadvantages. In particular, the above mentioned techniques a), b) and c) are limited to the visible horizon from the observation station, i.e. at a few tens kilometres from the coast. Moreover, as far as the solution c) is concerned, the system AIS being used is not secure, and it is easy to modify the transmitted data so as to display a wrong position and/or identity.

As far as the technique d) is concerned, it provides in principle a complete cover of the seas of the terrestrial globe.

However, due to the structure of the system AIS which generates a correct rhythm of transmission of the signals only in cells of a few tens of kilometres of diameter, whereas a satellite receives simultaneously the signals from several cells, the simultaneous emission of signals AIS from several cells makes their reception quasi impossible in areas with a strong maritime traffic (Horn of Africa, Cape of Good Hope, middle of the Atlantic ocean where several routes are crossing, etc.). Moreover, with such a technique d), there is frequently a significant delay (of more than one hour) in the retransmission of information collected by the satellites in a low orbit, since it is necessary to wait until the latter pass above a base station to return the collected information back. Furthermore, such a technique d) also depends of the integrity of the generated information AIS.

An object of the present invention is to remedy these disadvantages. It concerned a ship tracking system at sea, in particular on the high seas, allowing an economical solution to be provided so as to perform a secure tracking for the ship, and this in particular in areas with a strong maritime traffic.

For this purpose, according to the invention, said tracking system for ships at sea is remarkable in that it comprises:
 terminals mounted on a predetermined number of collecting ships, each of said collecting ships comprising a terminal including:
  means for detecting identification signals emitted by surrounding ships located in a collecting area around the corresponding collecting ship;
  means for determining the current position of the corresponding collecting ship; and
  means for recording identification information comprising the identification signals being detected and the current position of the collecting ship upon such detection;
 a satellite data transmission system, allowing data to be transmitted between said terminals which are mounted on the collecting ships and at least one monitoring centre; and
 said monitoring centre comprising at least:
  means for generating requests which are transmitted by said data transmission system to said terminals so as to ask them to provide the recorded identification information;
  means for receiving identification information provided by said terminals, via said data transmission system, in response to a request; and
  means for analyzing the identification information being received.

Thus, thanks to the invention, the identification signals are first collected by a limited number of collecting ships before being transmitted as identification information to the monitoring centre through satellites of the data transmission system.

Moreover, an identification information transmission is only performed in response to a request. Consequently, the monitoring centre which manages the generation and the emission of the request controls the reception of data, allowing not to be submerged by too a large information flux, and this whatever the traffic. Moreover, such information flux is reduced by the use of collecting ships which are the only to send information relative to the ships (located in the collecting area being associated) to said monitoring centre.

Moreover, thanks to the invention, the identification information comprises, in addition of the identification signals received from the surrounding ships, the position of the collecting ship upon such detection. This position enables to verify that the identification information is not wrong, by checking that the position provided by a ship identification signal is compatible with the efficient position of the collecting ship which has detected such an identification signal.

Furthermore, as the tracking system according to the invention uses a satellite data transmission system, it is able to operate everywhere on the terrestrial globe and particularly on the high seas, far from the coasts.

Preferably, said monitoring centre comprises means for sequentially sending requests at destination of the terminals located in a predetermined area, for example an area of a particular interest. That allows the monitoring centre to receive identification information in a coordinated way.

In a particular embodiment, each terminal comprises a secure housing and alarm means being formed so as to send an alarm signal at destination of said monitoring centre via said data transmission system, upon an opening of said secure housing.

Moreover, advantageously, each terminal comprises in addition:
 electrical power means;
 at least one reception antenna for identification signals;
 at least one reception antenna for positioning data; and
 at least one data transmission antenna.

Moreover, a terminal can also comprise
 means for coding the recorded identification information, and this preferably according a coding being specific to said terminal; and/or data reception means for a remote tracking of the status of a ship.

Furthermore, advantageously, said monitoring centre comprises in addition means for storing the identification information and making them accessible to users.

Further, in a particular embodiment, said tracking system comprises in addition means for remotely activating and inactivating a data transmission from the terminals.

The single FIGURE of the accompanying drawing will make well understood how the invention can be implemented. This single FIGURE is the block diagram of a system according to the invention for tracking ship at sea.

Said system 1 according to the invention comprises:
- a plurality of terminals 2, only one of which has been represented on the FIGURE for simplification reason in the drawing, each of said terminals 2 being mounted on a so-called collecting ship, the collecting ships being in a limited number;
- a data transmission system 3 comprising satellites 4, only one of which is represented on the FIGURE, again for simplification reason in the drawing; and
- at least one monitoring centre 5 which is provided in a fixed position on the ground.

Moreover, each terminal 2 mounted on a collecting ship comprises as shown on the FIGURE:
- a receiver 6 cooperating with at least one antenna 7 and being able to receive AIS type identification signals, precisely mentioned hereinunder, which are emitted by surrounding ships located in a particular collecting area around the collecting ship provided with said terminal 2, for example in a circle centred around the position of the collecting ship, the radius (for instance a few tens of kilometres) of which is lower than the maximum distance of detection of the identification signals by the means 6 and 7;
- a usual receiver 8 cooperating with an appropriate antenna 9 for receiving information from a usual satellite positioning system, not shown, in particular of the GPS ("Global Positioning System") type. Such information allows to determine in an unusual way the current position of the collecting ship; and
- means 10 which are connected through links 11 and 12, respectively, with the receivers 6 and 8 and which are formed so as to record identification information.

According to the invention, identification information comprises identification signals detected by the receiver 6 and the current position of the collecting ship at the time of this detection, which is provided by the receiver 8, as well as the identity of said collecting ship.

Said means 10 record this identification information in a data storing memory 13, as shown by a link 14.

The system 1 according to the invention thus cooperates with an automatic identification system, preferably of the AIS ("Automatic Identification System") type, which is an automated message exchanging system between ships by radio communication at very high frequencies of the VHF type. In a particular embodiment, any ship equipped with a system of the AIS type transmits periodically (between 2 and 10 seconds generally), in particular the following information:
- the identification number of the ship;
- a navigation statute such as: berthed, at anchor, in fishing operation, etc.
- the route of the ship on the bottom;
- the velocity on the bottom;
- the speed of change of course;
- the position in longitude and in latitude;
- the true course; and
- the time.

Moreover, generally, the following information is also periodically transmitted by the system AIS, for example each six minutes:
- the name of the ship;
- the type of vessel;
- the dimensions of the ship;
- the position of the antenna AIS on the ship;
- the type of satellite positioning instrument;
- the destination;
- the estimation of the arrival time at destination; and
- the number of crew members.

Each terminal 2 comprises in addition data transmission means 15 cooperating with an antenna 16 and which are able to emit information in direction of the data transmission system 3, as well to receive information from said data transmission system 3, as shown by a link L1 on the FIGURE. Said means 15 are in contact either in a continuous way or in an intermittent way with the satellites 4 of the system 3.

Said terminal 2 can also be equipped with sensors or signal reception means being specific to a ship and to the freight thereof and allowing the status thereof to be tracked remotely.

Said terminal 2 also comprises electrical power means 17. Such electrical power means 17 can be of any type. They can in particular comprise a buffer battery which is recharged by the on-board power of the ship and/or a solar panel arranged on the ship and/or any other power source.

Furthermore, said data transmission system 3 comprises a plurality of usual communication satellites 4, which are put on a low orbit and/or at high altitude and which enable the transmission of instructions towards the terminal 2 and the reception of information collected by such terminals 2.

Further, the monitoring centre 5 which is in contact with the satellites 4 of said system 3, as illustrated by a link L2 (via an antenna 18 cooperating with an antenna 19 of the satellites 4), provides the remote management of the terminals 2, the tracking of the collecting ships equipped with such terminals 2, as well ships located in corresponding collecting areas. Said monitoring centre 5 also provides the management and the diffusion of data being useful for customers, as precisely mentioned hereinunder, Said monitoring centre 5 comprises data transmission management means 20 which cooperate with the antenna 18 and are able, via said system 3, to send instruction at destination (and to receive information from) of the different terminals 2 of the system 1 according to the invention.

Thus, thanks to the system 1 according to the invention, the identification signals are first collected by a predetermined limited number of collecting ships, before being transmitted as identification information to the monitoring centre 5 through satellites 4 of the data transmission system 3.

Moreover, said monitoring centre 5 also comprises:
- means 21 which are connected through a link 22 to said means 20 and which are formed for generating requests being transmitted by the data transmission system 3 to the terminals 2 to ask them to provide recorded identification information; and
- means 23 which are connected through a link to said means 20 and which are formed so as to analyze the identification information provided by the terminals 2 and received by the means 20, in response to a request.

Said monitoring system 5 also comprises:
- means 25 which are, for example, connected through a link 26 to said means 23 and which are formed so as to store the identification information being received and treated; and
- means 27 which are, for example, connected through a link 28 to said means 25 and which are formed so as to make such information accessible to users, in particular customers, for example shipowners who buy such information. The means 26 can also be adapted, in that case, to manage a possible invoicing of the information being provided.

Furthermore, each terminal 2 comprises a secure housing 29 and alarm means (not shown) which are formed so as to send an alarm signal at destination of said monitoring centre 5 via said data transmission system 3, upon an opening of said secure housing 29.

Moreover, in a particular embodiment, said system 1 also comprises means (not shown) for remotely activating and inactivating a data transmission from the terminals 2.

The system 1 according to the invention operates as follow:
- the terminals 2 which are arranged, for example, on the bridge or on a mast of the collecting ship so as to present a good radio electrical visibility on the whole horizon, listen to the communication by satellites;
- the means 10 of each terminal 2 regularly process identification signals of the AIS type being received and store them in the memory 13 with the current position being received from the receiver 8. In a particular embodiment, said means 10 perform a coding of such data with a key being specific to said terminal so as to provide safety and integrity upon the subsequent transmissions and processings. Moreover, to reduce the quantity of data to be transmitted, the means can be controlled to as to store only the data changes and compress them;
- the monitoring centre 5 sequentially queries, via the system 3, the different terminals 2 located in areas of interest and each terminal 2 provides in response its identity, its position as well as the content of the identification signals being detected and stored from the last request. Preferably, the identification signals emitted by a collecting ship in the framework of the system AIS are also captured and processed by such collecting ship (or another) as the other identification signals emitted by the ships located in the collecting area thereof;
- the monitoring centre 5 can control the transmission rhythm of the terminals 2 so as to exert a close tracking in an area of interest;
- the monitoring centre stores and analyzes the data being received. This information can be supported over the time to detect intentional or accidental inconsistencies. In particular, the monitoring centre 5 is able to detect anomalies, such as the data AIS corruption in the collecting ship or risky situations due to the proximity of other ships, coasts or exceptional climatic phenomena; and
- the monitoring centre 5 put their useful data at disposal of customers and provides for the invoicing of such a service.

The system 1 according to the invention presents in particular the following advantages:
- it operates on the high seas, in particular thanks to the use of communication links by satellites 4;
- as, in addition of the identification signals, it also provides the position of the collecting ship, it allows the position indicated in the identification signals to be checked;
- the monitoring centre 5 manages the reception of data that it needs, in particular by sending in a coordinated way requests so that the system according to the invention can be used in all the regions, even in those having a strong maritime traffic;
- the possibility to remotely activate and inactivate the transmission of the terminals 2 allow for reducing the cost of the traffic passing through the data transmission system 3 while holding the collection of identification information thanks to the memory of the terminals 2. In particular, the satellite transmission can be stopped for a collecting ship when the latter is in an area covered by another collecting ship; and
- the system 1 according to the invention can be implemented in a quick and progressive way by using pre-existing communication satellites while expecting the positioning of dedicated means.

The invention claimed is:

1. A tracking system for ships at sea, said system comprising:
   terminals mounted on a predetermined number of collecting ships, each of a terminal including:
      means for detecting identification signals emitted by surrounding ships located in a collecting area around the corresponding collecting ship;
      means for determining the current position of the corresponding collecting ship;
      means for recording identification information comprising the identification signals being detected and the current position of the collecting ship upon such detection; and
      means for coding the recorded identification information according to a coding specific to said terminal;
   a satellite data transmission system, allowing data to be transmitted between said terminals which are mounted on the collecting ships and at least one monitoring center; and
   said monitoring center comprising at least:
      means for generating requests which are transmitted by said data transmission system to said terminals so as to request the terminals to provide the recorded identification information;
      means for receiving identification information provided by said terminals, via said data transmission system, in response to a request; and
      means for analyzing the identification information being received.

2. The system according to claim 1, characterized in that each terminal comprises a secure housing and alarm means being formed so as to send an alarm signal at a destination of said monitoring center via said data transmission system, upon an opening of said secure housing.

3. The system according to claim 1, wherein each terminal comprises in addition:
   electrical power means;
   at least one reception antenna for the identification signals;
   at least one reception antenna for positioning data; and
   at least one transmission antenna cooperating with satellites of the data transmission system.

4. The system according to claim 1, wherein each terminal also comprises reception means for signals specific to a ship.

5. The system according to claim 1, wherein said monitoring center comprises means for sequentially sending requests at a destination of the terminals located in a determined area.

6. The system according to claim 1, wherein said monitoring center comprises in addition means for storing the identification information and making the identification information accessible to users.

7. The system according to claim 1, wherein the system comprises in addition means for remotely activating and inactivating a data transmission from the terminals.

* * * * *